US012356333B2

(12) United States Patent
Chong et al.

(10) Patent No.: US 12,356,333 B2
(45) Date of Patent: *Jul. 8, 2025

(54) LISTEN-BEFORE-TALK SYSTEMS, DEVICES, AND METHODS BASED ON INTRA-DEVICE OPERATIONS

(71) Applicant: Apple Inc., Cupertino, CA (US)

(72) Inventors: Chia Yiaw Chong, San Jose, CA (US); Pablo Luis Vila Rodriguez, Los Altos, CA (US); Sajeev Alakkatt Paleri, Santa Clara, CA (US); Qiong Wu, Campbell, CA (US); Kai Bai, San Jose, CA (US); Hsin-Yuo Liu, Fremont, CA (US); Peter M. Agboh, Burlingame, CA (US); Derek Keith Shaeffer, Redwood City, CA (US); Daya Krishna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,721

(22) Filed: Jul. 11, 2023

(65) Prior Publication Data

US 2023/0354201 A1 Nov. 2, 2023

Related U.S. Application Data

(63) Continuation of application No. 17/589,385, filed on Jan. 31, 2022, now Pat. No. 11,722,964, which is a
(Continued)

(51) Int. Cl.
*H04W 52/02* (2009.01)
*H04W 72/044* (2023.01)
(Continued)

(52) U.S. Cl.
CPC ... *H04W 52/0274* (2013.01); *H04W 72/0473* (2013.01); *H04W 72/52* (2023.01); *H04W 74/085* (2013.01)

(58) Field of Classification Search
CPC ...... H04B 1/40; H04B 7/0413; H04B 17/309; H04B 17/318; H04B 17/336;
(Continued)

(56) References Cited

U.S. PATENT DOCUMENTS 8,258,955 B1 9/2012 Hyde et al.
8,797,927 B2 8/2014 Chen
(Continued)

FOREIGN PATENT DOCUMENTS

CN 101297507 A 10/2008
CN 101796740 A 8/2010
(Continued)

OTHER PUBLICATIONS

Office Action and Search report for Chinese Patent Application No. 202111042951.1 dated Dec. 26, 2023; 7 pgs.
(Continued)

*Primary Examiner* — Quochien B Vuong
(74) *Attorney, Agent, or Firm* — Fletcher Yoder, P.C.

(57) ABSTRACT

The present disclosure relates to systems and methods for operating a control signal to communicate signals using a first antenna and a first frequency band in response to determining that intra-device operations are occurring or are expected to occur, that a first amount of energy received by the first antenna is less than a threshold amount of energy, and that the first antenna is unaffected by the intra-device operations. The control signal may also delay communication of the signals in response to determining that intra-
(Continued)

device operations are occurring, and that first amount of energy is greater than or equal to the threshold amount of energy.

20 Claims, 10 Drawing Sheets

Related U.S. Application Data continuation of application No. 17/015,627, filed on Sep. 9, 2020, now Pat. No. 11,272,457.

(51) Int. Cl.
*H04W 72/52* (2023.01)
*H04W 74/08* (2024.01)
*H04W 74/0833* (2024.01)

(58) Field of Classification Search
CPC ............ H04B 17/345; H04W 52/0254; H04W 52/027; H04W 52/0274; H04W 52/245; H04W 72/04; H04W 72/0473; H04W 72/0486; H04W 72/08; H04W 72/082; H04W 88/02; H04W 88/06
See application file for complete search history.

(56) References Cited

U.S. PATENT DOCUMENTS

| | | | |
|---|---|---|---|
| 9,144,084 B2 | 9/2015 | Sadek et al. | |
| 9,173,174 B2 | 10/2015 | Koo et al. | |
| 9,379,837 B2 | 6/2016 | Jindal et al. | |
| 9,445,276 B2* | 9/2016 | Krishnamoorthy | ........................ H04W 72/0453 |
| 9,510,222 B2 | 11/2016 | Yerramalli et al. | |
| 9,679,454 B2 | 6/2017 | Mishra et al. | |
| 9,749,925 B2 | 8/2017 | Chrisikos et al. | |
| 9,762,368 B2 | 9/2017 | Narasimha et al. | |
| 9,781,735 B2 | 10/2017 | Comsa et al. | |
| 9,941,959 B2 | 4/2018 | Heath et al. | |
| 10,200,974 B2 | 2/2019 | Azizi et al. | |
| 10,412,752 B2 | 9/2019 | Wu et al. | |
| 10,999,772 B2 | 5/2021 | Thomas | |
| 11,564,285 B2* | 1/2023 | Park | ........................ H04B 1/401 |
| 2007/0066228 A1 | 3/2007 | Leinonen et al. | |
| 2010/0222051 A1 | 9/2010 | Watanabe et al. | |
| 2012/0207040 A1 | 8/2012 | Comsa et al. | |
| 2015/0133185 A1 | 5/2015 | Chen et al. | |
| 2015/0139015 A1* | 5/2015 | Kadous | ............ H04W 72/1215 370/252 |
| 2015/0188599 A1 | 7/2015 | Shi et al. | |
| 2016/0127007 A1 | 5/2016 | Wang et al. | |
| 2017/0245317 A1 | 8/2017 | Lee et al. | |
| 2019/0190583 A1 | 6/2019 | Natarajan et al. | |
| 2020/0014472 A1 | 1/2020 | El-Hassan et al. | |
| 2020/0091989 A1 | 3/2020 | Ashiwal et al. | |
| 2021/0135739 A1 | 5/2021 | Cohn et al. | |

FOREIGN PATENT DOCUMENTS

| | | |
|---|---|---|
| CN | 106165310 A | 11/2016 |
| CN | 108702196 A | 10/2018 |
| CN | 110692205 A | 1/2020 |
| CN | 110692206 A | 1/2020 |
| EP | 3029900 A1 | 6/2016 |
| WO | 2015027675 A1 | 3/2015 |

OTHER PUBLICATIONS

Office Action and Search report for Chinese Patent Application No. 202210971418.1 dated Oct. 31, 2024; 8 pgs.

* cited by examiner

LISTEN-BEFORE-TALK SYSTEMS, DEVICES, AND METHODS BASED ON INTRA-DEVICE OPERATIONS

CROSS-REFERENCE TO RELATED APPLICATIONS

This application is a continuation of U.S. patent application Ser. No. 17/589,385, entitled "LISTEN-BEFORE-TALK SYSTEMS, DEVICES, AND METHODS BASED ON INTRA-DEVICE OPERATIONS", filed Jan. 31, 2022, which is a continuation of U.S. patent application Ser. No. 17/015,627, entitled "LISTEN-BEFORE-TALK SYSTEMS, DEVICES, AND METHODS BASED ON INTRA-DEVICE OPERATIONS", filed Sep. 9, 2020, each of which is herein incorporated by reference in its entirety for all purposes.

BACKGROUND

The present disclosure relates generally to electronic devices, and more particularly, to electronic devices that utilize radio frequency signals, transmitters, and receivers for wireless communication.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication systems are rapidly growing in usage. In recent years, wireless devices such as smartphones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Transmitters and/or receivers may be included in various electronic devices to enable communication between devices. Many electronic devices may communicate at least partially at a same time in a same room and/or region. However, overlapping communications may increase a chance of interference between concurrent communications affecting a quality or success of one or more of the communications.

To reduce a likelihood of interference between communications, an electronic device may listen to airwaves to verify that the airwaves are clear of ongoing communications before transmitting a new communication and/or enabling a receiver. Signals associated with ongoing communications may be received as signal noise, or energy, by antennas of the electronic device. The electronic device may compare received noise to a threshold amount of noise, and determine to delay communications if the received noise is greater than the threshold amount of noise. This process is generally referred to as a listen-before-talk (LBT) operation. Indeed, the listen-before-talk operation may include an electronic device verifying that noise received by one or more antennas is less than a threshold amount of noise, thus verifying that each antenna is clear, before transmitting a data packet to another electronic device. While these methods permit transmission if each antenna receives less than the threshold amount of noise, these methods also prevent transmission from an antenna that receives less than the threshold amount of noise if another antenna receives the amount of noise greater than the threshold amount. That is, if any of the antennas sense an energy level (e.g., receive an amount of noise) above the threshold, no antenna (even those that sense an energy level below the threshold) may be permitted to transmit. This all or nothing approach may drastically reduce efficiencies of operation since an amount of noise received at one antenna is being presumed to also affect another antenna, stopping transmission from all antennas, even if some antennas receive amounts of noise less than the threshold amount of noise.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Previous listen-before-talk (LBT) operations resulted in a device delaying communications on each antenna if any antenna sensed an energy level greater than a noise threshold. However, electronic devices are complex systems, where many radios, sub-radios, concurrent communicators, and the like, are integrated into a small form factor device. When multiple radios concurrently operate, and/or when some sub-systems operate (e.g., when communication with a universal serial bus (USB) is performed) concurrent to communications, nearby antennas may receive some emitted electromagnetic waves from these operations as noise. When following listen-before-talk (LBT) operations, a control system may sense that an amount of noise received from a respective antenna is greater than the noise threshold and confuse the noise source as an ongoing communication.

To improve these operations, systems and methods described herein relate to selective control of antennas based on the amount of noise received from a respective antenna. These techniques may be compatible with listen-before-talk (LBT) operations and may reduce a likelihood that a noise from a source other than an ongoing communication from an external antenna triggers a delay in communication.

For example, rather than delaying communications using multiple antennas if only some of the antennas sense noise, communications may be sent over the multiple antennas if at least one antenna is clear. In another example, communications may be sent or received over only the antennas that are clear, while not using the antennas that sense noise to send or receive communications. In particular, an antenna determined as affected by concurrent operation of a sub-system may be flagged in a memory of the electronic device during manufacturing (e.g., hardcoded based on test results). If the electronic device determines that the sub-system is in operation, the electronic device may reference the flags (e.g., indications) to determine whether to consider or ignore noise received by the antenna. For example, the electronic device may continue to use a flagged antenna if the flagged antenna receives noise greater than the threshold amount of noise since the flagged antenna had been previously indicated as affected by sub-system operation. In some cases, the electronic device may determine if every antenna of an antenna panel senses the amount of noise greater than noise threshold, and thus may indicate if the electronic device is to delay communication.

Various embodiments may be used to deploy the disclosed systems. For example, a device may include a first antenna that communicates over a first frequency band, a second antenna that communicates over the first frequency band, and a third antenna that communicates over a second frequency band that overlaps with the first frequency band. The device may also include one or more processors that cause communication of signals from the first antenna and the second antenna in response to determining that the third antenna is not communicating using the second frequency band, that a first amount of energy received by the first antenna is less than a threshold amount of energy, and that a second amount of energy received by the second antenna is less than the threshold amount of energy. The one or more processors may delay the communication of the signals in response to determining that the third antenna is not communicating using the second frequency band, and that the first amount of energy or the second amount of energy is greater than or equal to the threshold amount of energy. The one or more processors may cause the communication of the signals from the first antenna and the second antenna in response to determining that the third antenna is communicating using the second frequency band, that one of the first amount of energy and the second amount of energy is less than the threshold amount of energy, and that another one of the first amount of energy and the second amount of energy is greater than or equal to the threshold amount of energy. Furthermore, the one or more processors delay the communication of the signals in response to determining that the third antenna is communicating using the second frequency band, and that the first amount of energy and the second amount of energy are each greater than or equal to the threshold amount of energy.

In some embodiments, a method may include receiving an indication from memory that communications using a first antenna are unaffected by intra-device operations. The method may include communicating signals using the first antenna via a first frequency band in response to determining that the intra-device operations are occurring, that a first amount of energy received by the first antenna is less than a threshold amount of energy, and that the first antenna is unaffected by the intra-device operations. Furthermore, the method may include delaying communication of the signals in response to determining that the intra-device operations are occurring, and that the first amount of energy is greater than or equal to the threshold amount of energy.

In yet another embodiment, one or more tangible, non-transitory, computer-readable storage media include executable instructions that, when executed by one or more processors, cause the one or more processors to cause communication of signals using a first frequency band from a first antenna and a second antenna in response to determining that a first amount of energy received by the first antenna is less than a threshold amount of energy, and that a second amount of energy received by the second antenna is less than the threshold amount of energy. The instructions may also cause the one or more processors to delay the communication of the signals in response to determining that the first amount of energy and the second amount of energy is greater than or equal to the threshold amount of energy. The instructions may also cause the one or more processors to cause the communication of the signals from the first antenna in response to determining that the first amount of energy is less than the threshold amount of energy, and that the second amount of energy is greater than or equal to the threshold amount of energy. Moreover, the instructions may also cause the one or more processors to cause the communication of the signals from the second antenna in response to determining that the first amount of energy is greater than or equal to the threshold amount of energy, and that the second amount of energy is less than the threshold amount of energy.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure generally describes systems, devices, and methods that selectively use antennas to communicate when operating according to listen-before-talk (LBT) procedures. The disclosed processes bring certain advantages to operation, as are described herein. With the foregoing in mind, a general description of suitable electronic devices that may include practice such processes is provided below.

Figure 1:
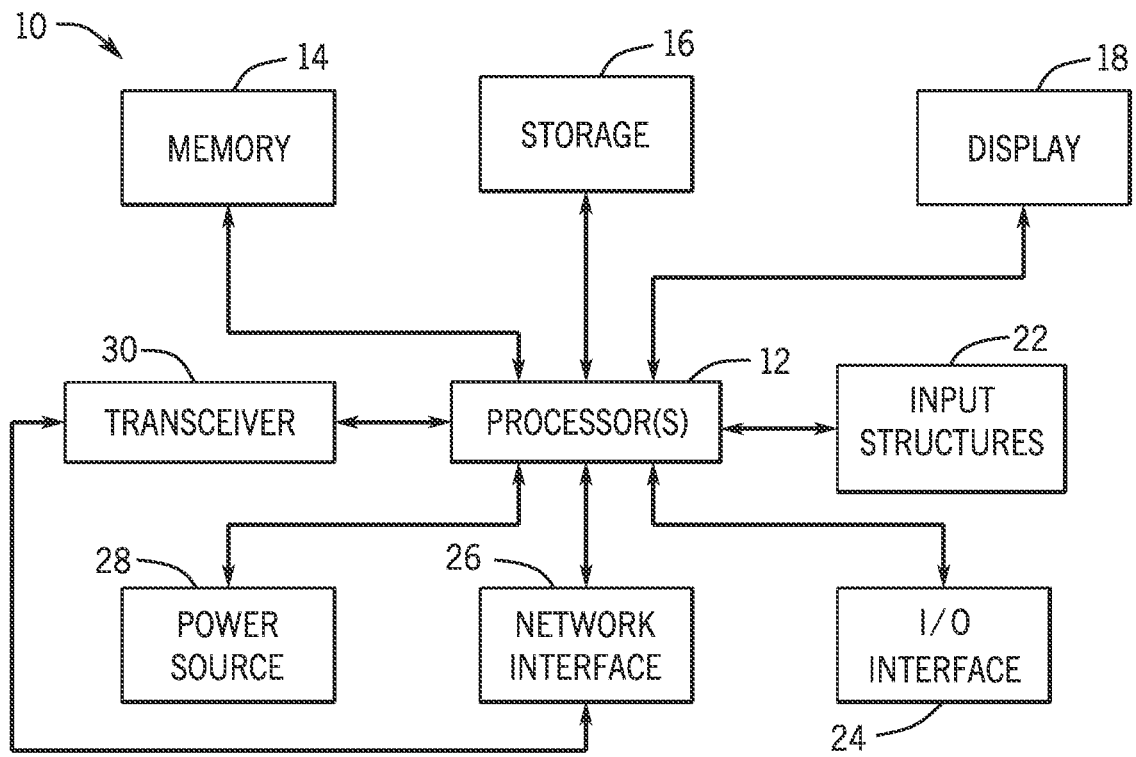
FIG. 1 is a schematic block diagram of an electronic device including a transceiver, in accordance with an embodiment of the present disclosure.

Turning first to FIG. 1, an electronic device 10 according to an embodiment of the present disclosure may include, among other things, one or more of processor(s) 12, memory 14, nonvolatile storage 16, a display 18, input structures 22, an input/output (I/O) interface 24, a network interface 26, a power source 28, and a transceiver 30. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. It should be noted that FIG. 1 is merely one example of a particular embodiment and is intended to illustrate the types of elements that may be present in the electronic device 10.

Figure 2:
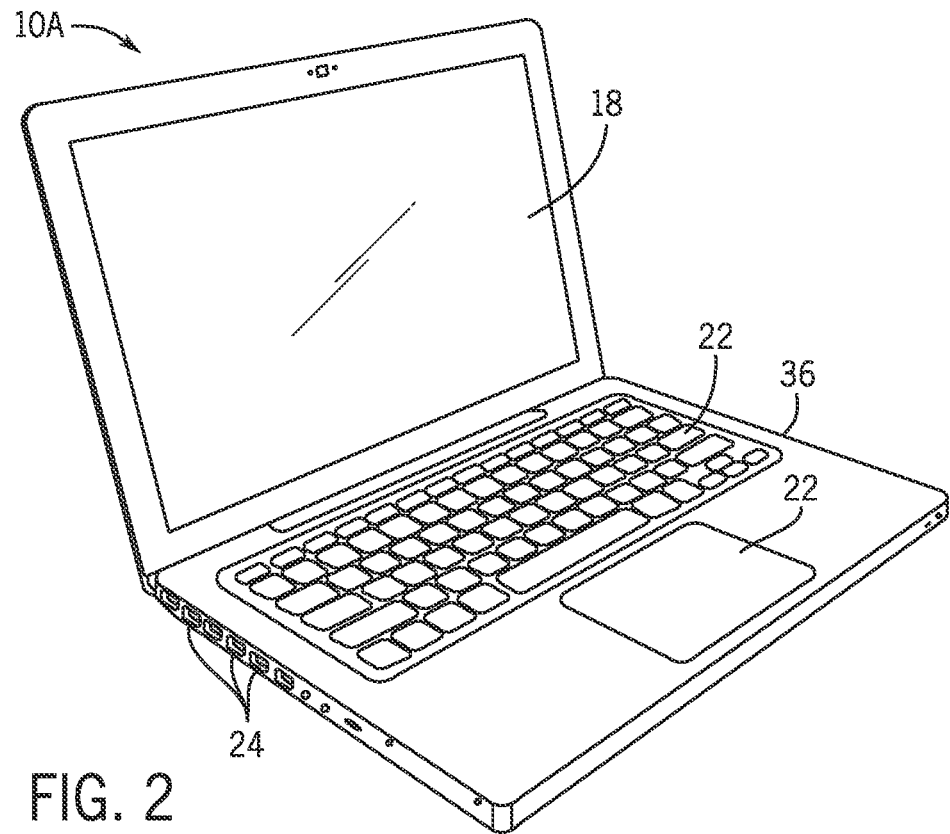
FIG. 2 is a perspective view of a notebook computer representing a first embodiment of the electronic device of FIG. 1.
Figure 4:
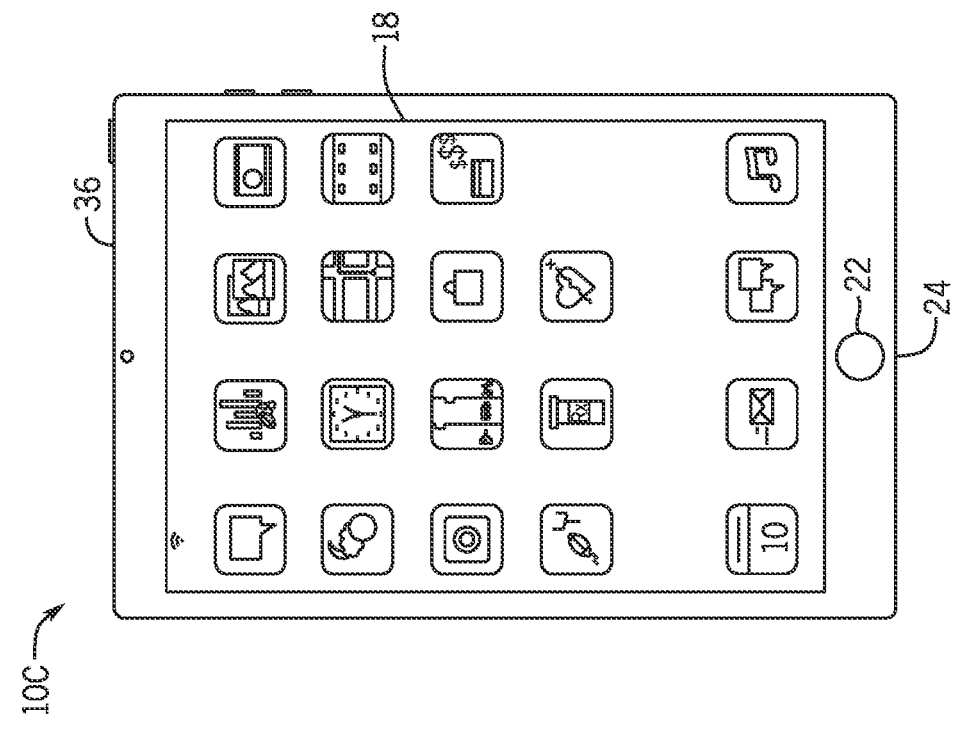
FIG. 4 is a front view of another handheld device representing a third embodiment of the electronic device of FIG. 1.
Figure 3:
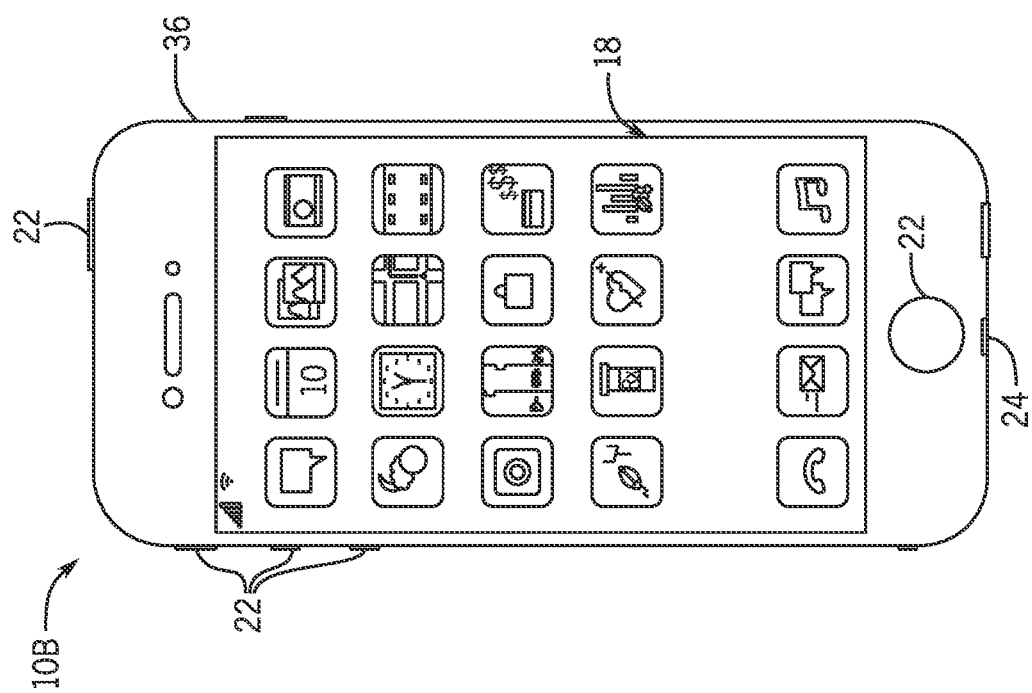
FIG. 3 is a front view of a handheld device representing a second embodiment of the electronic device of FIG. 1.
Figure 5:
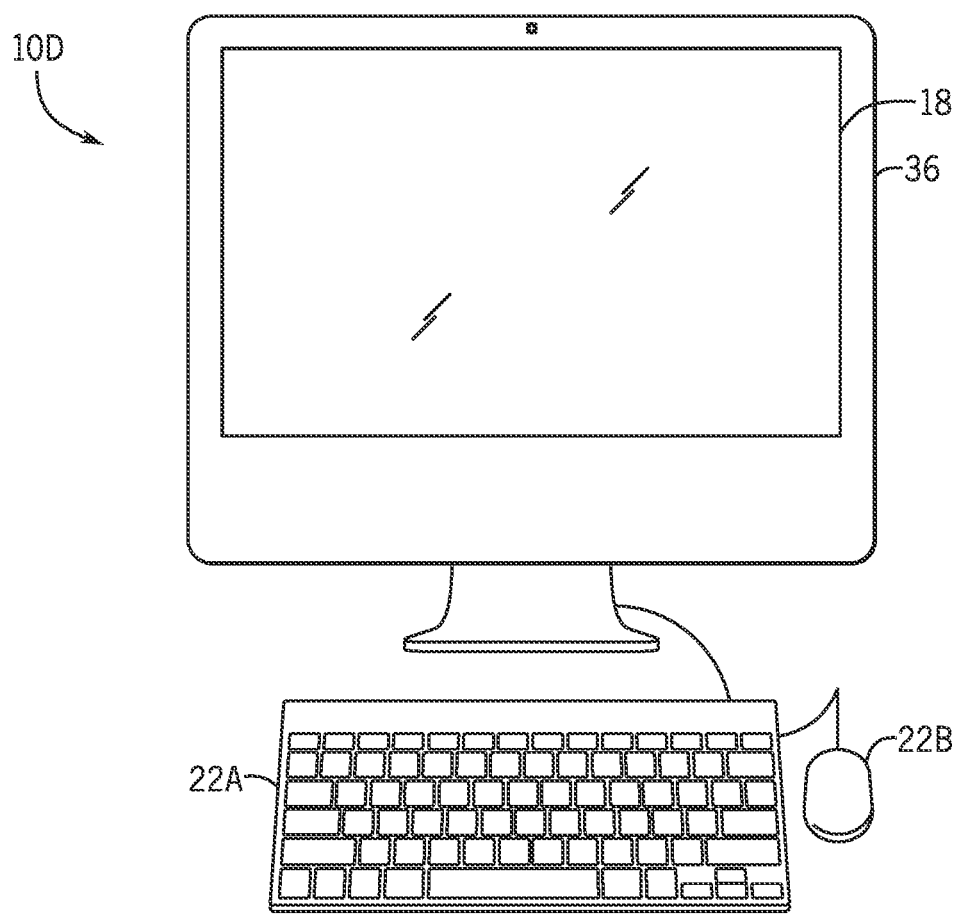
FIG. 5 is a front view of a desktop computer representing a fourth embodiment of the electronic device of FIG. 1.
Figure 6:
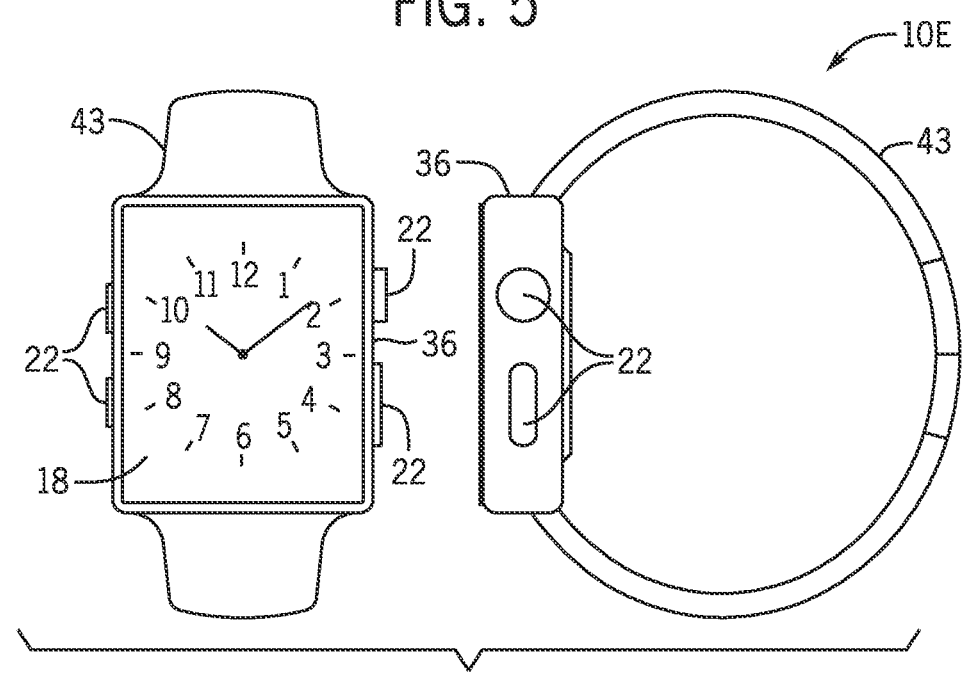
FIG. 6 is a front view and side view of a wearable electronic device representing a fifth embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

In certain embodiments, the display 18 may include a liquid crystal display (LCD) or a digital micromirror display (DMD), one or more organic light emitting diode (OLED) displays, or some combination these, which may enable users to view images generated by the electronic device 10. In some embodiments, the display 18 may include a touch screen, which may facilitate user interaction with a user interface of the electronic device 10.

In some cases, the one or more processors 12 may operate circuitry to input or output data generated by the electronic device 10. For example, the one or more processors 12 may control and/or operate the memory 14, the nonvolatile storage 16, display 18, input structures 22, an input/output (I/O interface) 24, a network interface 26, a transceiver 30, a power source 28, or the like to perform operations of the electronic device 10 and/or to facilitate control of the operations of the electronic device. In particular, the one or more processors 12 may generate control signals for operating the transceiver 30 to communicate using one or more communication networks.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a 3rd generation (3G) cellular network, 4th generation (4G) cellular network, LTE cellular network, long term evolution license assisted access (LTE-LAA) cellular network, 5th generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

In some embodiments, the electronic device 10 communicates over the aforementioned wireless networks (e.g., 4G, LTE®, 5G) using the transceiver 30. The transceiver 30 may include circuitry useful in both wirelessly transmitting and receiving signals (e.g., data signals, wireless data signals, wireless carrier signals, RF signals), such as a transmitter and a receiver. Indeed, in some embodiments, the transceiver 30 may include a transmitter and a receiver combined into a single unit, or, in other embodiments, the transceiver 30 may include a transmitter separate from a receiver. The transceiver 30 may transmit and receive RF signals to support voice and/or data communication in wireless applications in the networks listed above or any suitable network, such as PAN networks, WLAN networks, UWB networks, and the like. As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) or used in one place (such as desktop computers, workstations and/or servers). In certain embodiments, the electronic device 10 in the form of a computer may be a model of a MACBOOK®, MACBOOK® PRO, MACBOOK AIR®, IMAC®, MAC® mini, or MAC PRO® available from Apple Inc. of Cupertino, California. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® or IPHONE® available from Apple Inc. of Cupertino, California. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a connector and protocol, such as the Lightning connector provided by Apple Inc. of Cupertino, California, a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, and/or may be a standalone media player or video gaming machine. By way of example, the computer 10D may be an IMAC®, a MACBOOK®, or other similar device by Apple Inc. of Cupertino, California. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an APPLE WATCH® by Apple Inc. of Cupertino, California. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E. In certain embodiments, as previously noted above, each embodiment (e.g., notebook computer 10A, handheld device 10B, handheld device 10C, computer 10D, and wearable electronic device 10E) of the electronic device 10 may include the transceiver 30.

Figure 7:
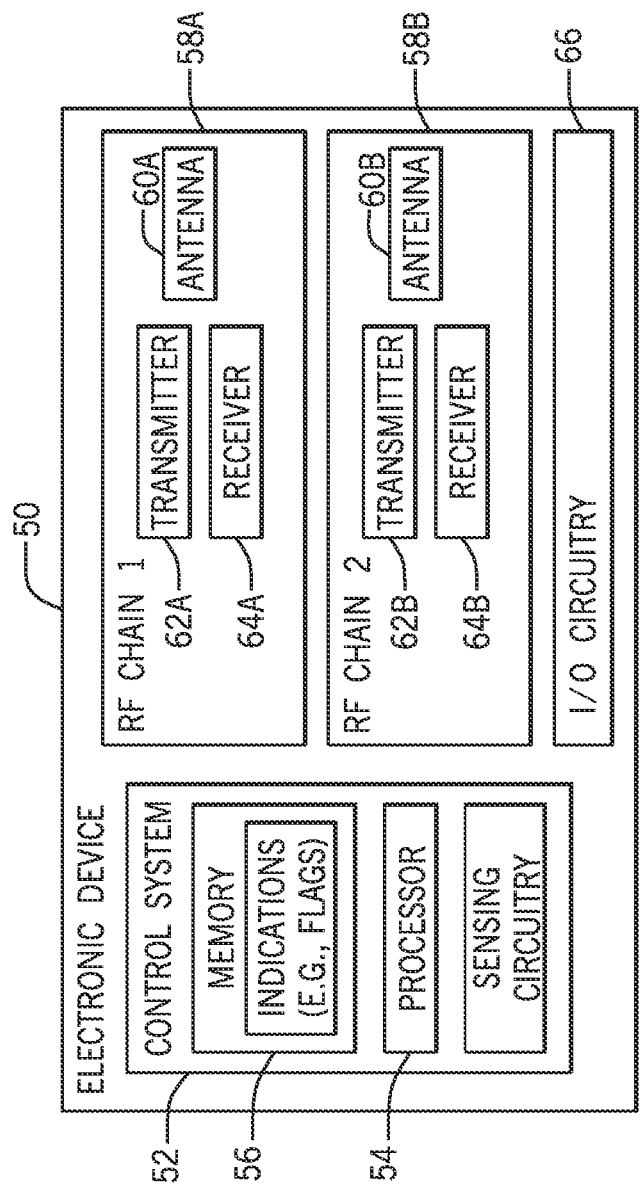
FIG. 7 is a block diagram of an electronic device that includes multiple radio frequency (RF) circuitry chains (RF chains), in accordance with an embodiment of the present disclosure.

Keeping the forgoing in mind, FIG. 7 is a block diagram of an electronic device 50 that includes multiple radio frequency (RF) circuitry chains (RF chains), in accordance with an embodiment of the present disclosure. The electronic device 50 may also include each of the components illustrated in FIG. 1. For example, the electronic device 50 may include a control system 52 having a processor 54 that may operate similar to the processors 12 of FIG. 1 and a memory 56 that may operate similar to the memory 14 of FIG. 1.

The control system 52 may control operations of radio frequency (RF) chains 58 (RF chain 58A, RF chain 58B) of the electronic device 50. The control system 52 may indicate to the RF chain 58A when to transmit and/or receive messages on antenna 60A, and may indicate to the RF chain 58B when to transmit and/or receive messages on antenna 60B. It is noted that each of the RF chains 58 may include one or more antennas 60, and may include non-equal number of antennas 60. The antennas 60 may be grouped in one or more antenna panels, not particularly shown herein. Moreover, the two RF chains 58A, 58B are exemplary, and there may be more or less RF chains 58 than shown in FIG. 7.

The control system 52 may transmit a control signal to transmitter 62A to cause the transmitter 62A to transmit a data packet using the antenna 60A. In response to receiving the control signal, the transmitter 62A may prepare or process the data packet for transmission and transmit the data packet using radio frequency waves. Similarly, the control system 52 may transmit a control signal to the transmitter circuitry 62B to cause the transmitter 62B to transmit a data packet using the antenna 60B. The control system 52 may also transmit a control signal to receiver 64A to cause the receiver 64A to receive signals using the antenna 60A. The receiver 64A may, in response to the control signal, prepare to receive signals using the antenna 60A and may process any received signals according to configurations implemented by the control system 52. Similarly, the control system 52 may transmit a control signal to receiver 64B to cause the receiver 64B to receive signals using the antenna 60B.

The electronic device 50 may also include input/output (I/O) circuitry 66, which may include and/or be coupled to the I/O interface circuitry 24 and/or network interface 26 of FIG. 1. Indeed, the electronic device 50 may receive input data from components coupled to the electronic device 50 via the additional I/O circuitry 66. For example, USB devices may couple to the electronic device 50 at the additional I/O circuitry 66.

The control system 52 may operate the electronic device 50, and more particularly the RF chains 58, according to a listen-before-talk (LBT) procedure. That is, the control system 52 may verify that a frequency range (e.g., a communication channel defined using multiple frequencies within a frequency band) is clear of ongoing communications, prior to transmitting a data packet using one or more of the antennas 60. Although beneficial for reducing a likelihood of communication interruptions or interference, these operations may not permit a "clear" antenna (e.g., an antenna that does not detect ongoing communications) to transmit a data packet when another antenna detects an ongoing communication. Furthermore, listen-before-talk procedures may consider intra-device interference that may not cause communication interruptions or interference, such as noise generated by a USB device or another device coupled at the I/O circuitry 66, or a concurrently operating antenna, as causing communication interruptions or interference.

For example, antenna 60B may use a frequency range that overlaps with that used by the antenna 60A when communicating, even when antenna 60B and antenna 60A use different type of communications (e.g., cellular communication, Wi-Fi communication). When one antenna (e.g., 60B) is used, the other antenna (e.g., 60A) may receive some of the communication from the used antenna 60B as noise. In listen-before-talk procedures, this noise may be misinterpreted as disruptive or interfering, and the control system 52 may delay communications to avoid interrupting the ongoing communication on the airways. The noise, however, may not cause communication interruptions or interference, and thus communication may continue without degradation or loss.

Figure 8:
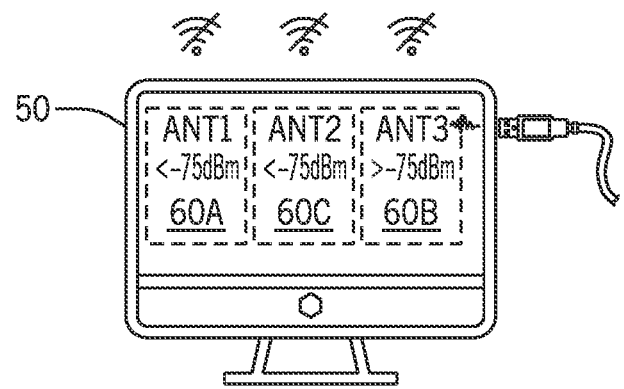
FIG. 8 is an illustration of the example electronic device of FIG. 7 having three antennas, where one antenna receives noise greater than a threshold amount, two antennas receive noise less than the threshold amount of noise, and none of the antennas are used to communicate, in accordance a conventional listen-before-talk procedure.

To elaborate, FIG. 8 is an illustration of the electronic device 50 with three antennas 60 (e.g., antenna 60A, antenna 60B, antenna 60C), where the antenna 60B receives noise greater than a threshold amount of noise, the antenna 60A and antenna 60C receive noise less than the threshold amount of noise, and none of the antennas 60 are used to communicate, in accordance with a conventional listen-before-talk procedure. In this case, and as in the examples shown in FIGS. 9A, 9B, and 12, the threshold amount of noise corresponds to a power of the noise, measured in decibel-milliwatts (dBm). Although any suitable noise power that disrupts communication via the antennas 60 may be used as the threshold amount of noise, for purposes of this disclosure, the threshold amount of noise is substantially similar to −75 dBm (e.g., an amount between −70 dBm and −80 dBm).

Indeed, when following listen-before-talk procedures, even though antenna 60A and antenna 60C receive a noise less than the threshold amount of noise, the control system 52 instruct transmitters 62 for each of the antennas 60 to delay transmissions (e.g., to not transmit). These listen-before-talk operations may be improved when, for example, the control system 52 selectively considers which of the antennas 60 are known to be affected by the USB device or another device coupled at the additional I/O circuitry 66 before determining to delay transmission in response to just the antenna 60B experiencing the noise, as elaborated on below with regards to at least FIGS. 9-11. Indeed, when performing listen-before-talk procedures while considering intra-device operations, communication using the electronic device 50 may improve. Communications may improve since, for example, fewer false positives may be detected, thereby increasing the time spent communicating. That is, intra-device operations may not be confused as talking on a frequency band (e.g., communication channel), and thus communications may continue rather than be disrupted. In some cases, firmware and/or a software application of the electronic device 50 may indicate the intra-device operations to the control system 52. Thus, these systems and methods may permit processing operations to control communication circuitry via indication to the control system 52. For example, the processor 54 of the electronic device 50 may generate and send control signals to the control system 52 that indicate an ongoing USB device operation or another external device operation. The control system 52 may then adjust communication operations based on which communication circuitries are affected by the ongoing operations. Additionally or alternatively, listen-before-talk operations may improve when, for example, the control system 52 delays transmission corresponding to only the antenna 60B experiencing the noise, as elaborated on below with regards to at least FIGS. 12-15, thus enabling other antennas 60 to continue communicating.

Figure 9A:
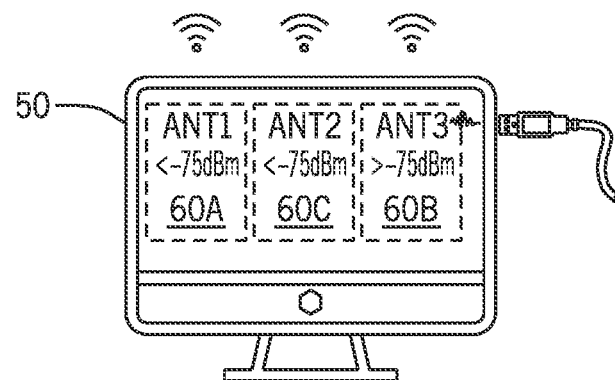
FIG. 9A is an illustration of the example electronic device of FIG. 7 having three antennas, where one antenna receives noise greater than a threshold amount, two antennas receive noise less than the threshold amount of noise, and each of the antennas are used to communicate, in accordance with an embodiment of the present disclosure.

In particular, FIG. 9A is an illustration of the electronic device 50 with the antennas 60A, 60B, and 60C, where the antenna 60B receives noise greater than a threshold amount of noise, the antenna 60A and antenna 60C receive noise less than the threshold amount of noise, and each of the antennas 60 are used to transmit one or more data packets, in accordance with an embodiment of the present disclosure. Indeed, in this example, the control system 52 may reference the memory 56 (e.g., memory 14) to determine that the antenna 60B is impaired when the USB device or when another device is coupled at the I/O circuitry 66 (e.g., such that the USB device or the other device may interfere with communications sent or received using the antenna 60B). Since the antenna 60B is impaired, the control system 52 may not use the antenna 60B to communicate. In this example, where the antenna 60B is impaired while inter-device interference is present (e.g., the USB device or other device is plugged into the electronic device 50), the antenna 60B noise levels may be an inaccurate indication of whether ongoing communications are occurring. Thus, the control system 52 may instead use an indication of noise received by the antenna 60A and/or the antenna 60C to determine when to delay transmission operations. In this way, the control system 52 may delay transmissions on one or more antennas 60 when antenna 60A and/or antenna 60C receives noises greater than a threshold amount of noise as opposed to when the antenna 60B receives the noises.

Figure 9B:
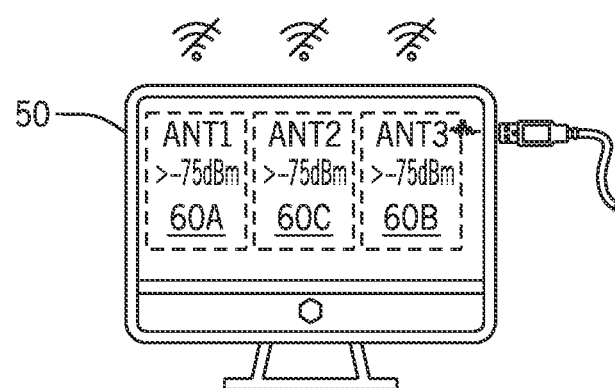
FIG. 9B is an illustration of an example electronic device of FIG. 7 having three antennas, where three antennas receive noise greater than a threshold amount and none of the antennas are used to communicate, in accordance with an embodiment of the present disclosure.

This example is shown in FIG. 9B, which is an illustration of the electronic device 50 with the antennas 60A, 60B, and 60C, where the antennas 60 each receive noise greater than a threshold amount of noise, and the control system 52 delays transmissions scheduled for each of the antennas 60, in accordance with an embodiment of the present disclosure. Indeed, as with the example of FIG. 9A, the antenna 60B is known as impacted from intra-device interference, and thus is a relatively inaccurate indicator of whether ongoing communications are occurring. However, since the antenna 60A and/or the antenna 60C are relatively more accurate indicators of whether ongoing communications are occurring, the control system 52 may determine to delay transmit operations since these antennas 60A, 60C receive noise greater than the threshold amount of noise.

Figure 10:
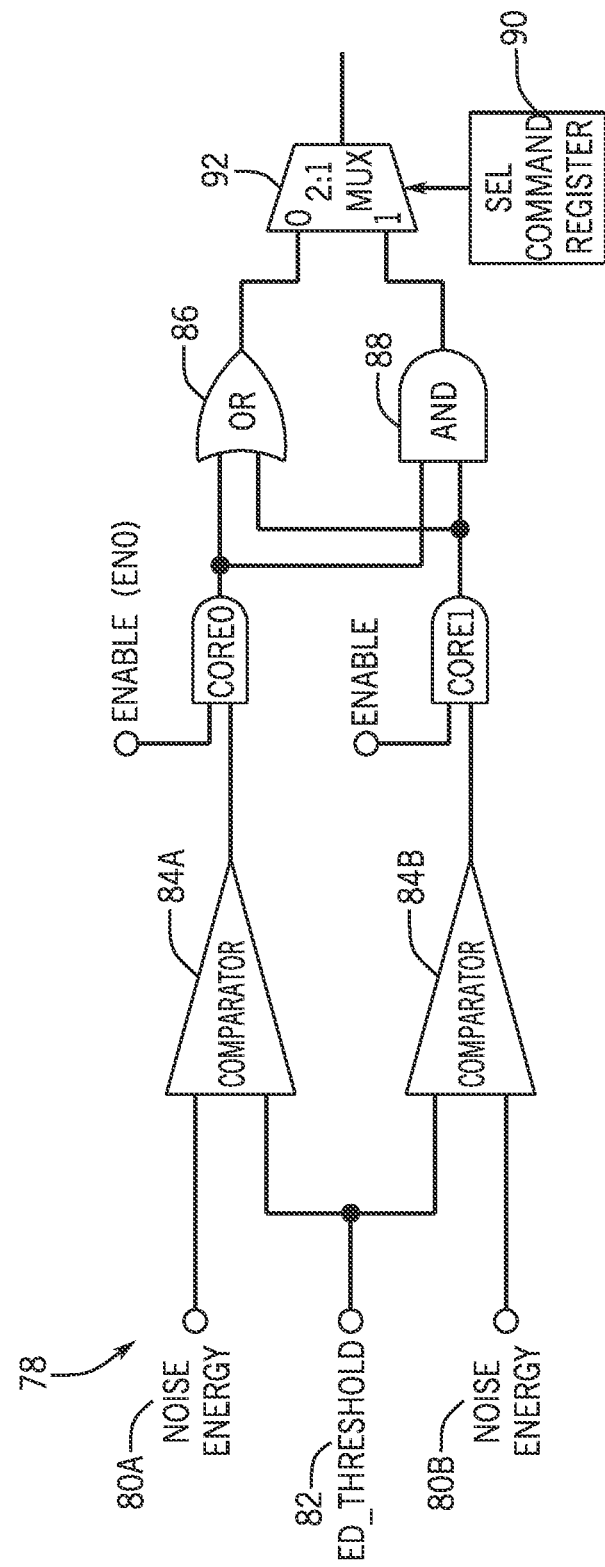
FIG. 10 is a block diagram of logic circuitry used to generate an indication of noise received by the antennas of the electronic device of FIG. 7, in accordance with an embodiment of the present disclosure.

To elaborate, FIG. 10 is a block diagram of logic circuitry 78 used to generate an indication of noise received by the antennas 60 of the electronic device 50, in accordance with an embodiment of the present disclosure. The logic circuitry 78 may be disposed within the control system 52, within a Wi-Fi chipset of the electronic device 50, and/or any suitable location within the electronic device 50. Indeed, each RF chain 58 of the electronic device 50 may include the logic circuitry 78. The logic circuitry 78 may compare received noise energies 80A of a first antenna 60, such as antenna 60A, to a noise energy level threshold 82 using a comparator 84, or other suitable comparison circuitry. This comparison may be repeated for noise energies 80B for another antenna 60B using comparator 84B. When a respective noise energy 80A, 80B is greater than a voltage value of the noise energy level threshold 82, a signal transmits to an OR logic gate 86 and an AND logic gate 88. Based at least in part on a mode signal saved in a command register 90, either the OR logic gate 86 output or the AND logic gate 88 output is transmitted from multiplexer 92.

The control system 52 may control which mode (e.g., an OR mode or an AND mode) that the logic circuitry 78 operates. The mode may be set via configuration information (e.g., one or more configuration bits) stored in the command register 90. The output from the multiplexer 92 either matches the output from the OR logic gate 86 or matches the output from the AND logic gate 88. In the AND mode, the control system 52 may delay communication of the electronic device 50 only when each antenna 60 receives an amount of noise energy 80 greater than or equal to the noise energy level threshold 82. However, in the OR mode, the control system 52 may delay communication of the electronic device 50 when any of the antennas 60 receives an amount of noise energy 80 greater than or equal to the noise energy level threshold 82.

Figure 11:
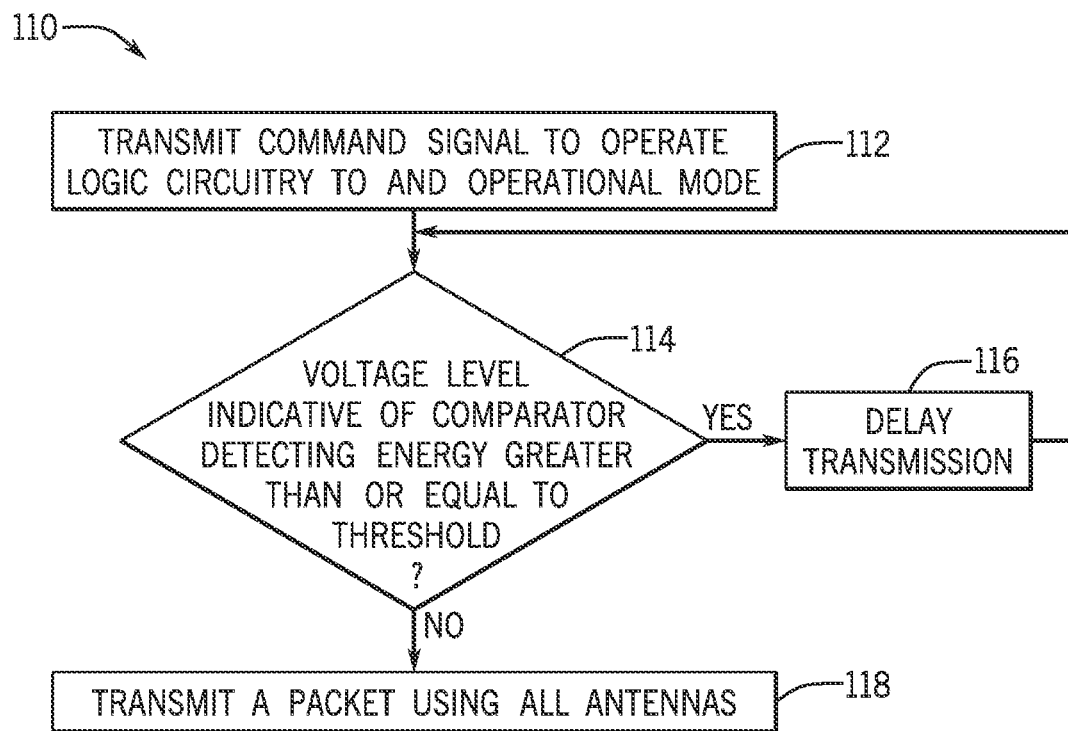
FIG. 11 is a flow chart of a method for operating the electronic device of FIG. 7 to communicate or delay communication in response to a signal output from the logic circuitry of FIG. 10, in accordance with an embodiment of the present disclosure.

The resulting indication from the multiplexer 92 may be integrated into an operational flow of the control system 52. FIG. 11 is a flow chart of a method 110 for operating the electronic device 50 to transmit or delay transmission in response to a signal output from the logic circuitry 78, in accordance with an embodiment of the present disclosure. It is noted that, although depicted in a particular order, the blocks of the method 110 may be performed in any suitable order, and at least some blocks may be skipped altogether. Furthermore, it is noted that although the method 110 is directed toward transmit operations, similar operations may be used in receive operations, such as determining when to turn on a receiver since turning on a receiver in response to noise as opposed to a message may undesirably consume power. As described herein, the method 110 is described as performed by the control system 52 of the electronic device 50, however, it should be understood that any suitable processing and/or control circuitry may perform some or all of the operations of the method 110, such as one or more of the processors 12 or the like.

At block 112, the control system 52 transmits a command signal to operate logic circuitry 78 in an AND operational mode. The control system 52 may generate a control signal as the command signal for storage in the command register 90 of the logic circuitry 78. In this way, when the command signal has a first state, the logic circuitry 78 is operated in a first operational mode (e.g., OR mode) and when the command signal has a second state, the logic circuitry 78 is operated in a second operational mode (e.g., AND mode). It is noted that there may be cases where data stored in the command register 90 as a result of the command signal may be used as a trigger to power off portions of the logic circuitry 78 to save power, such as by disabling the logic gate 86 and/or the logic gate 88 while not in use.

At block 114, the control system 52 receives an output from the logic circuitry 78, and determine whether the output is a voltage level indicative of each comparator 84 detecting that the respective noise energy 80 was greater than the noise energy threshold 82. For example, the voltage level may include a logic high voltage level (e.g., logic high output). When the respective noise energy 80 received by every antenna 60, impaired (such that a USB device or other device coupled to the electronic device 50 negatively impacts operation of the antenna 60) and non-impaired (such that the USB device or other device coupled to the electronic device 50 does not negatively impact operation of the antenna 60), is greater than or equal to the noise energy level threshold 82, the control system 52 may deem transmission unsuitable, and thus may delay transmission at block 116. Similar processes apply to when the control system 52 sets the logic circuitry 78 to an OR operational mode; however, the control system 52 may delay transmission at block 116 when any of the antennas 60 receives noise energy 80 greater than or equal to the noise energy level threshold 82.

At block 116, because each comparator 84 detected that the respective noise energy 80 was greater than the noise energy level threshold 82, the control system 52 signals to transmitter 62 to delay transmission (e.g., by not transmitting a scheduled packet). The control system 52 may resume transmission at another uplink, downlink, or other transmission opportunity, such as one indicated by a communication configuration. In some cases, the control system 52 may resume transmission when the output signal from the logic circuitry 78 has a logic low voltage level (e.g., logic low output) generally indicating that resuming transmission is not going to disrupt an ongoing communication.

Referring back to block 114, when the signal output from the logic circuitry 78 does not have the voltage level indicative of the comparator detecting the respective noise energy 80 as greater than or equal to the noise energy threshold 82, at block 118, the control system 52 transmits a packet using each antenna 60. It is noted that the control system 52 may periodically poll the logic circuitry 78 for the output signal and/or may receive the output signal on an ongoing basis.

Figure 12:
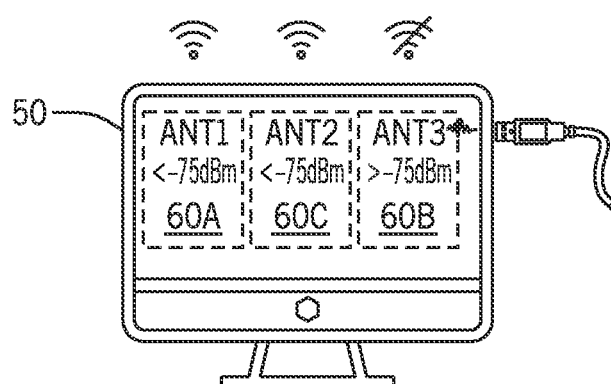
FIG. 12 is an illustration of an example electronic device of FIG. 7 having three antennas, where one antenna receives noise greater than a threshold amount, two antennas receive noise less than the threshold amount of noise, and the two antennas are used to communicate, in accordance with an embodiment of the present disclosure.

As described above, listen-before-talk operations may improve when, for example, the control system 52 delays transmission for just the antenna 60B experiencing the noise, as elaborated on with regards to at least FIG. 12-15. FIG. 12 is an illustration of an example electronic device 50 having three antennas 60, where the antenna 60B receives noise greater than a threshold amount, two antennas 60A, 60C receive noise less than the threshold amount of noise, and the two antennas 60A, 60C of the antennas 60 proceed with transmission, according to embodiments of the present disclosure. The electronic device 50 of FIG. 12 may independently determine whether to communicate using each of the three antennas 60. When the control system 52 determines that an antenna 60 is clear, the control system 52 may use the antenna 60 to communicate. However, when the control system 52 determines that an antenna 60 is not clear, the control system 52 may not use the antenna 60 to communicate. Both of these decisions may be made independent of a decision made for another antenna 60. It is noted that the independent determinations may combine with aspects of the AND logic decision illustrated in FIGS. 9A and 9B to ignore noise energies 80 received by antennas 60 known as impacted by intra-device interferences (e.g., impaired antennas) when determining which antennas to use in transmission.

Figure 13:
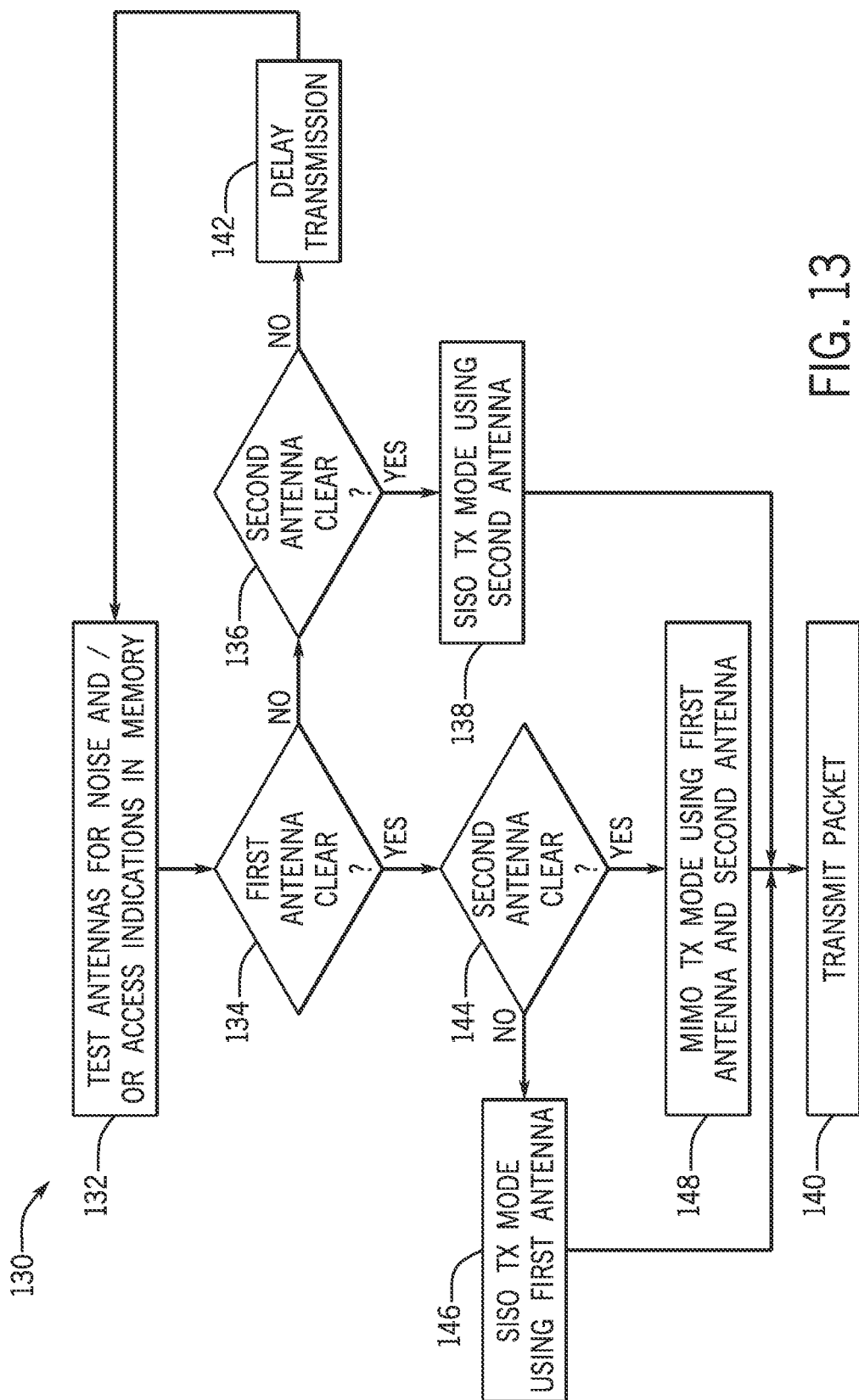
FIG. 13 is a flow chart of a method for operating the electronic device of FIG. 7 to adjust or delay transmission in response to noise received by one or more antennas, in accordance with an embodiment of the present disclosure.

To elaborate, FIG. 13 is a flow chart of a method 130 for operating the electronic device 50 to adjust or delay transmission in response to noise received by one or more antennas 60, in accordance with an embodiment of the present disclosure. It is noted that, although depicted in a particular order, the blocks of the method 130 may be performed in any suitable order, and at least some blocks may be skipped altogether. As described herein, the method 130 is described as performed by the control system 52 of the electronic device 50, however, it should be understood that any suitable processing and/or control circuitry may perform some or all of the operations of the method 130, such as one or more of the processors 12 or the like.

At block 132, the control system 52 tests the antennas 60 for noise and/or receives indications of noise stored in memory 56 (e.g., memory 14). Indications of noise, such as amounts of noise sensed, may be generated if additional sensing circuitry is used to identify noise amounts sensed by the antennas 60. The noise may include the noise energies 80 (e.g., energy) received at each respective antenna 60. The antenna 60 may be "clear" in each of the FIGS. 13-15 when its received noise is less than the threshold amount of noise. The control system 52 may perform the method 130 to determine whether to communicate using a multiple-in, multiple-out transmission or reception mode (e.g., MIMO TX mode, MIMO RX mode) or a single-in, single-out transmission or reception mode (e.g., SISO TX mode, SISO RX mode). The "MIMO TX mode" refers to a transmission that uses multiple antennas 60 and the "MIMO RX mode" refers to a reception that uses multiple antennas 60. The "SISO TX mode" refers to a transmission that uses a single antenna 60 and the "SISO RX mode" refers to a reception that uses a single antenna 60.

In some cases, the receiver 64 may also be initialized to communicate in a matching transmission mode to the transmitter 62, such as when response communications are expected to be returned in a similar format as transmitted. Indeed, dual MIMO and SISO capable devices may be enabled through use of a queue where the control system 52 generates packets for transmission using both MIMO TX and SISO TX, adds the packets to a queue, and determines prior to transmission whether to use MIMO TX, SISO TX, or multiple SISO TX at once to transmit data. In some cases, packets stored in the queue may be designed for transmission using MIMO TX or SISO TX, and thus the transmitter 62 may retrieve the packets from the same queue. In some cases, a first packet may be designed for transmission using MIMO TX and a second packet may be designed for transmission using SISO TX. The control system 52 may store the first packet and the second packet in different queues respective to the transmission types (e.g., MIMO TX queue, SISO TX queue) for access at a later time, such as when preparing to transmit the first packet or the second packet.

To decide between the SISO TX mode and the MIMO TX mode, at block 134, the control system 52 determines whether the first antenna 60 is clear or not. In particular, the control system 52 may determine whether the noise energies 80 and/or the indications of sensed noises from the memory 56 (or memory 14) corresponding to the first antenna 60 are less than a threshold amount of noise. If the control system 52 determines that the first antenna 60 is not clear, at block 136, the control system 52 determines whether the second antenna 60 is clear.

At block 138, if the control system 52 determines that the second antenna 60 is clear, the control system 52 configures at least the transmitter 62 to the SISO TX mode using the second antenna 60. It is noted that a SISO TX mode may involve communicating using any clear antenna 60 of the control system, as elaborated on further below, and should not be limited to only using the first antenna 60 when it is determined as clear. For example, it may be preferred to communicate using some antennas 60 in a SISO TX mode compared to other antennas 60, such as the case if one or more antennas are impacted from intra-device operations (e.g., such antennas 60 may be used if needed, but it may not be preferred to do so). Once the transmitter 62 is ready for transmission, such as after any calibrations are performed or transmission circuitries are powered on, at block 140, the control system 52 transmits a packet. The control system 52 may use the transmitter 62 to transmit the packet. If a queue is being used, the transmitter 62 may receive the packet for transmission from a queue corresponding to the SISO TX mode.

Returning to block 136, when the control system 52 determines that the second antenna 60 is not clear, at block 142, the control system 52 proceeds to delay at least transmissions using the first antenna 60 and second antenna 60. It is noted that in cases where the transmitter 62 includes additional antennas 60 (e.g., a third antenna 60), the control system 52 may continue to test each antenna 60 to determine whether any of the antennas 60 is clear for transmission. When no antenna 60 for the transmit operation is clear, the control system 52 may delay transmission for each of the antennas 60. It is noted that this control decision to delay transmissions may be made on a per-RF chain 58 basis, such that the control system 52 may delay transmission of the RF chain 58A without also delaying transmissions of the RF chain 58B. The control system 52 may delay transmit operations at least one communication cycle, such as until a subsequent uplink or transmission allocation is available. In some cases, the control system 52 may monitor or repeat testing of the antennas 60 for noise and/or repeat access of the indications in the memory 56 (e.g., memory 14) at block 132 and continue to perform operations of method 130 until finding a clear antenna 60 to use to transmit the data packet at block 140 according to a SISO TX or MIMO TX mode.

Returning to block 134, when the control system 52 determines that the first antenna 60 is clear, at block 144, the control system 52 may determine whether the second antenna 60 is clear or not. The control system 52 may access the noise energies 80 and/or the indications of sensed noises from the memory 56 (or memory 14). If the control system 52 determines that the second antenna 60 is not clear, at block 146, the control system 52 may proceed with configuration of at least the transmitter 62 to the SISO TX mode using the first antenna 60. It is noted that a SISO TX mode may involve any clear antenna 60 of the control system, as elaborated on further below, and should not be limited to using a first antenna 60 determined as clear. Once the transmitter 62 is ready for transmission, such as after any calibrations are performed or transmission circuitries are powered on, at block 140, the control system 52 may transmit the packet using the mode determined at block 146. If a queue is being used, the transmitter 62 may receive the packet for transmission from a queue corresponding to the SISO TX mode.

Returning to block 144, if the control system 52 determines that the second antenna 60 is clear, at block 148, the control system 52 configures at least the transmitter 62 to the MIMO TX mode using the first antenna 60 and the second antenna 60. When the electronic device 50 includes more than two antennas 60, the control system 52 may determine to transmit using each clear antenna 60, just the two clear antennas 60 (e.g., first antenna 60 and second antenna 60), or any number of clear antennas (e.g., after a suitable number of clear checks are performed, such as those at blocks 134, 136, and 144). Once the transmitter 62 is ready for transmission, such as after any calibrations are performed or transmission circuitries are powered on, at block 140, the control system 52 transmits the packet using the mode determined at block 146. If a queue is being used, the transmitter 62 may receive the packet for transmission from a queue corresponding to the MIMO TX mode.

Figure 14:
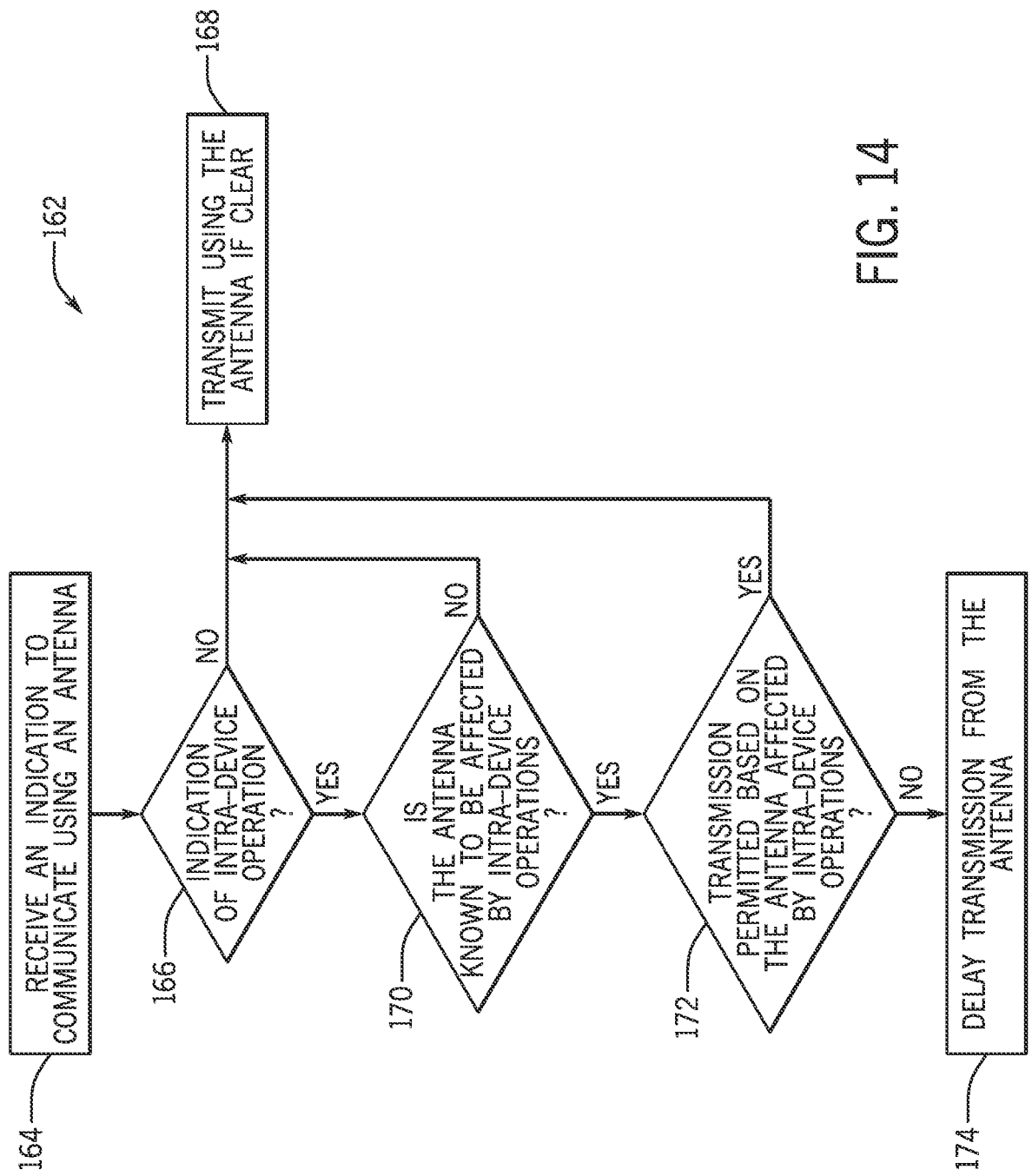
FIG. 14 is a flow chart of a method for operating the electronic device of FIG. 7 to adjust a single-input, single-output (SISO) transmission in response to noise received by one or more antennas, in accordance with an embodiment of the present disclosure.

To elaborate further on how antenna 60 preferences may affect control decisions and other considerations that may be taken into account when determining how to transmit a packet, FIG. 14 is a flow chart of a method 162 for operating the electronic device 50 to adjust single-input, single-output (SISO) transmission (SISO TX) operations in response to noise received by one or more antennas 60, in accordance with an embodiment of the present disclosure. It is noted that, although depicted in a particular order, the blocks of the method 162 may be performed in any suitable order, and at least some blocks may be skipped altogether. As described herein, the method 162 is described as performed by the control system 52 of the electronic device 50, however, it should be understood that any suitable processing and/or control circuitry may perform some or all of the operations of the method 162, such as one or more of the processors 12 or the like. It is noted that the following description of operations presume that each antenna 60 in consideration for use in the SISO TX operation has already been tested by the control system 52 and is determined as clear or as unclear.

At block 164, the control system 52 receives an indication to communicate using an antenna 60. The antenna 60 to be used may be a type of antenna compatible with protocols or frequencies used for a first type of communication, like Wi-Fi, cellular, Bluetooth communications. The control system 52 may adjust communication operations based on the type of antenna 60 to be used and whether an intra-device operation is ongoing since, for example, an ongoing intra-device operation may reduce an ability of an antenna 60 to accurately report talking on airways. Indeed, based on the combination of operations requested and operations ongoing, the control system 52 may delay communication and/or may adjust which antenna 60 is used for communication.

At block 166, the control system 52 may determine whether there is an indication that an intra-device operation is being performed. For example, the control system 52 may communicate using a second antenna 60 that uses an overlapping frequency and/or may communicate with a USB and/or other external device is plugged into the electronic device 50, causing interference to the communication using the first antenna 60. A second antenna 60 may use a same type of communication as the antenna 60 and/or may use a different type of communication as the antenna 60 that overlaps in frequency and causes noise at the antenna 60. Indeed, the control system 52 may receive the indication from memory 56, firmware, or user input, where firmware or user input may be used to generate and/or store the indication that the intra-device operation is being performed. The indications may indicate which of the antennas 60 are affected by intra-device operations. Since some antennas may be impacted from intra-device concurrent operations, while other may not, an additional check may be performed when determining which antenna 60 to use in a SISO TX mode transmit operation. Intra-device operations may include concurrent operation of another antenna 60 on an overlapping frequency band, concurrent operation of another antenna 60 on a non-overlapping frequency band, concurrent communication with a USB device or other external device, concurrent access to a power supply via a power connecting input to the electronic device 10, or the like.

In some cases, the indications may be learned over time by the control system 52 (e.g., via machine-learning techniques). For example, the control system 52 may have access to operational logs detailing antenna performance and operational logics detailing intra-device operations, and may analyze these logs to identify (e.g., over time) which intra-device operations negatively affect transmission operations of respective antennas 60, and may learn over time to adjust transmission during the identified operations. In some cases, the control system 52 also identifies which of the antennas 60 are affected by the intra-device operations, and to what degree they are affected, if at all. The indications to use intra-device operations may be generated based on these analyses and/or identifications and be accessed at block 170 to determine if there is an antenna 60 of the type known to be affected by the intra-device operations. In some cases, the control system 52 accesses the indications from encoded or stored data in memory 56 (e.g., memory 14). The control system 52 may additionally or alternatively correlate impacted antennas to current ranges of communication frequencies (e.g., frequencies used for the Wi-Fi transmission or other transmissions when the antennas 60 are to communicate using cellular frequencies, expected ranges to be used) and/or to current operational status (e.g., USB in use or no USB, external power connection in use or no external power connection).

When an indication is not received, at block 168, the control system 52 transmits a packet of data using the antenna 60 when the antenna 60 is clear. In some cases, the control system 52 may generate and store an indication in memory 56 corresponding to each antenna 60 and whether the antenna 60 is impacted by the intra-device concurrent operations and/or determined to be clear (e.g., receiving a noise energy less than a threshold level of noise energy). These flags may be accessed during later repetitions of the process 162 when determining which antenna 60 to use in a SISO TX mode transmit operation. After accessing indications in the memory 56 (or memory 14), the control system 52 may transmit the packet once determining that the antenna 60 is clear. If the antenna 60 is not clear, the control system 52 may use a next clear antenna 60 found.

Returning to block 166, if the control system 52 determines that an indication of an intra-device operation was received, the control system 52 determines, at block 170, whether the antenna 60 known as or is affected by the intra-device operations. It is noted that, as described above, intra-device operations may include operating conditions where concurrent communications using one or more overlapping frequencies and/or using a USB or other external coupling to the electronic device 50 relative to operations of block 164 (e.g., communications instructed at block 164). The control system 52 may make this determination for each antenna 60 of the type corresponding to the communication operation based on the one or more indications in the memory 56 (or memory 14). The control system 52, for example, may determine whether the communication may be of a relatively lower priority, such that if the transmission were to be interrupted, an incomplete transmission would be permitted. In some embodiments, the control system 52 may reference antenna preferences in the memory 56 (e.g., memory 14) to determine which antenna 60 to use.

If the antenna 60 is not affected by the intra-device operations, at block 168, the control system 52 transmits a packet of data using the antenna 60 when the antenna 60 is clear. Decisions related to clarity of an antenna 60 are similar to those decisions earlier with reference to operations of method 130, and thus previous discussions are relied upon herein.

Returning to block 170, if the antenna 60 is affected by the intra-device operations, the control system 52, at block 172, determines whether transmission is permitted via the antenna 60 affected by intra-device operations. In particular, the intra-device operation may negatively impact performance of communication using the antenna 60, to the point that there may be packet loss when using the antenna 60 to communicate. The control system 52 may reference indications stored in the memory 56 to determine whether or not these communications are permitted (e.g., transmission and/or reception). Communications may continue from an antenna 60 affected by intra-device operations when, for example, data being set is of relatively low priority, such that packet loss may not alter electronic device 50 operation.

If, at block 172, the control system 52 determines that transmission is not permitted via the antenna 60 affected by the intra-device operations, the control system 52, at block 174, delays transmission from the antenna 60. The control system 52 may use a different antenna 60 that is unaffected by intra-device operations and is determined to be clear as opposed to the antenna 60 indicated as affected by intra-device operations. That is, the control system 52 ensures that transmission is not performed by an antenna 60 affected by the intra-device operations.

When identifying another antenna 60 to use, the control system 52 may reference antenna preferences to determine which alternative antenna 60 to use and/or reference earlier sensing operations to determine which of the antennas 60 are clear. Antenna preferences may be set during manufacturing and stored in the memory 56 (e.g., memory 14). Antenna preferences additionally or alternatively may be learned over time by the control system 52 (and stored in memory 56 and/or memory 14), such as the control system 52 may track over time which antenna 60 is relatively more reliable for communications based on a frequency or likelihood of incomplete transmission happening when using the respective antenna. Once the antenna 60 is selected, the control system 52 may transmit the packet using the selected antenna 60 according to the SISO TX mode operations.

However, returning to block 172, if the control system 52 determines that transmission is permitted via the antenna 60 affected by the intra-device operations, at block 168, the control system 52 transmits data using the antenna 60 that is determined to be clear, regardless of whether the antenna 60 is affected by intra-device operations. Once the antenna 60 is selected, the control system 52 may transmit the packet using the selected antenna 60 according to the SISO TX mode operations.

Figure 15:
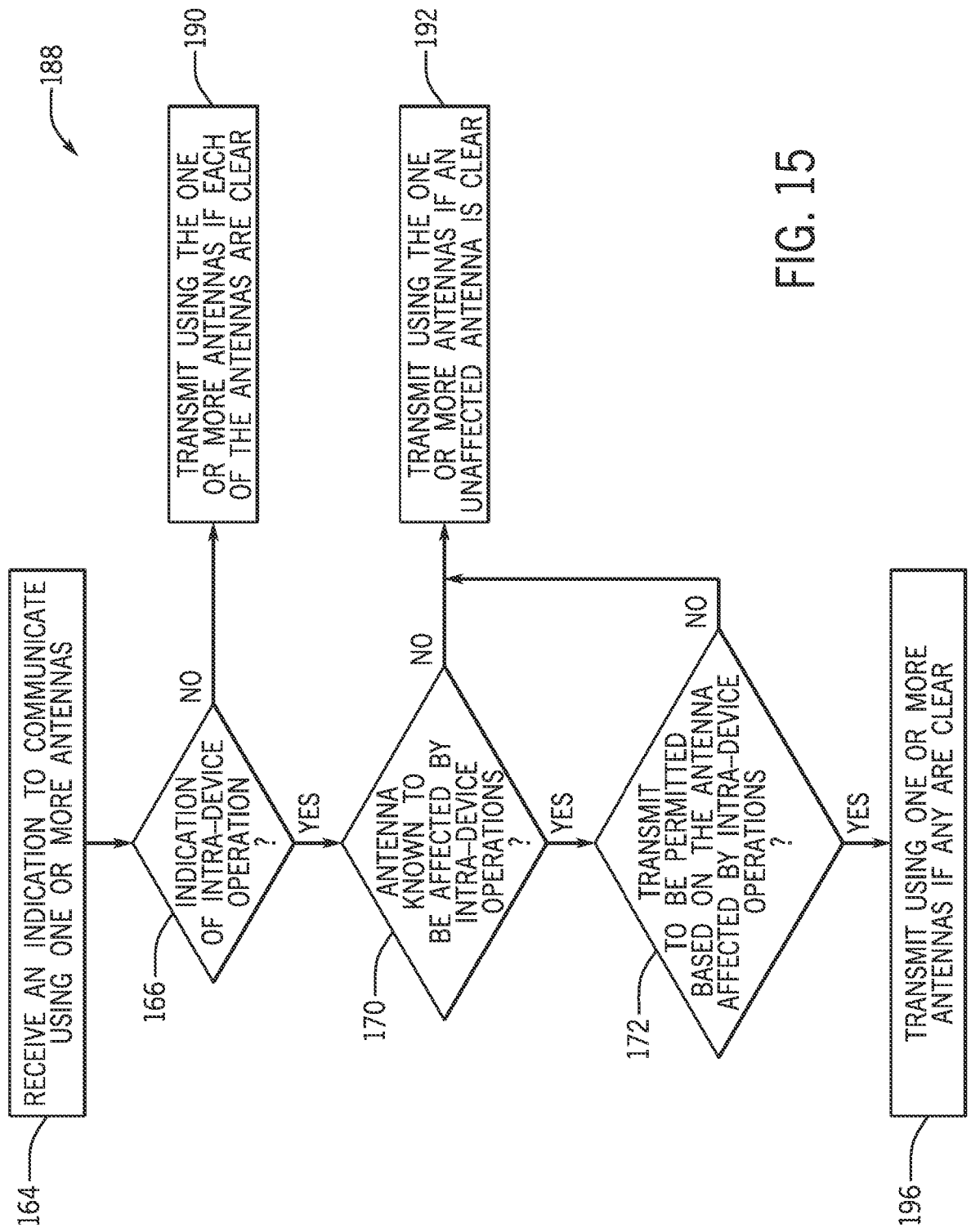
FIG. 15 is a flow chart of a method for operating the electronic device of FIG. 7 to adjust a multiple-input, multiple-output (MIMO) transmission in response to noise received by one or more antennas, in accordance with an embodiment of the present disclosure.

In some cases, it may be desired to use a MIMO TX system instead of the SISO TX system described with FIG. 14. Indeed, FIG. 15 is a flow chart of a method 188 for operating the electronic device 50 to adjust multiple-input, multiple-output (MIMO) transmission (MIMO TX) operations in response to noise received by one or more antennas 60, in accordance with an embodiment of the present disclosure. It is noted that, although depicted in a particular order, the blocks of the method 188 may be performed in any suitable order, and at least some blocks may be skipped altogether. As described herein, the method 188 is described as performed by the control system 52 of the electronic device 50, however, it should be understood that any suitable processing and/or control circuitry may perform some or all of the operations of the method 188, such as one or more of the processors 12 or the like. It is noted that the following description of operations presume that each antenna 60 in consideration for use in the MIMO TX operation has already been tested by the control system 52 and/or is determined as clear or unclear.

When performing the method 188, operations performed at blocks 164, 166, 170, and 172 may also be performed by the control system 52 when determining how to transmit using MIMO TX operations. Although the same determinations may be made, operations performed in response to the determinations may change for MIMO TX systems versus SISO TX systems (e.g., to accommodate and operate multiple antennas compared to a single antenna). For ease of description, descriptions of operations performed at blocks 164, 166, 170, and 172 are not repeated herein.

Indeed, at block 164, the control system 52 receives an indication to communicate using one or more antennas 60 (e.g., one or more Wi-Fi antennas). At block 166, the control system 52 determines whether an indication of an intra-device operation was received.

If, at block 166, the control system 52 determines that the indication was not received, the control system 52, at block 190, transmits a packet using each antenna 60 that is clear. The absence of the indication (or a different indication) may communicate to the control system 52 that an intra-device operation is not ongoing. When intra-device operations are not ongoing, the control system 52 may default to using each antenna 60 if each antenna 60 is clear (e.g., unflagged for noise energies 80 higher than the threshold amount of noise). When no intra-device operations affect a current transmission, noise energies 80 received by the antennas 60 correspond to talking occurring in the airways, and thus is to not be ignored.

However, if intra-device operations are ongoing, and the control system 52, at block 166, determines that an indication of intra-device operation was received, the control system 52, at block 170, determines whether there is an antenna 60 known as affected by the intra-device operation (e.g., receives interference when a sub-system operates concurrent to communication operations, receives interference when a USB is connected to the electronic device 50). If the control system 52 determines that there are no antennas 60 affected by intra-device operations, the control system 52, at block 192, transmits using each unaffected antenna 60 that is clear. Indeed, as long as one antenna 60 is clear when each antenna 60 is affected by intra-device operations on the overlapping frequency, the control system 52 may determine to communicate using the antennas 60.

Returning to block 170, the control system 52 determines that an antenna 60 is known to be affected by intra-device operations, and determines, at block 172, whether transmission is permitted based on the antenna 60 affected by the intra-device operations. If the control system 52 determines that transmission is not to be permitted based on the antenna 60 affected by intra-device operations, the control system 52, at block 194, transmits a packet using each antenna 60 if an unaffected antenna 60 is clear. The control system 52 may generally disregard noise readings from the antenna 60 affected by the intra-device operation and make control decisions based on the known unaffected antennas 60.

Returning to block 172, if the control system 52 determines that transmission is able to be permitted based on the antenna 60 affected by intra-device operations, the control system 52, at block 196, transmits a packet using each antenna 60 if an antenna 60 is clear (e.g., any antenna 60 is clear). Thus, the control system 52 may determine to transmit a packet via MIMO TX based at least on an indication of an antenna 60 being clear, regardless of whether the antenna 60 is impacted by intra-device operations.

In some cases, if the control system 52 determines an antenna 60 as clear, the control system 52 may store an indication of the clarity determination such that the determinations may not need to be re-determined. The clarity determinations may expire after a duration of time and may be repeated on an ongoing basis. It is noted that flagging antennas as clear and/or unimpaired may provide an embodiment where the control system 52 uses each antenna that is determined as clear and impaired (or is generally flagged). These examples that use stored indications may reduce an amount of time spent by the control system 52 preparing to communicate since the control system 52 may reference stored indications as opposed to redetermining clarity before each communication.

Technical effects of the present disclosure include systems and methods for operating transceiver circuitry to selectively use antennas based on noise received by the antennas. Considerations may be made when determining to not use an antenna for a transmission include whether the transmission is to be a MIMO TX or a SISO TX, whether intra-device operations overlap (e.g., indication of intra-device operation), whether one or more antennas 60 are affected by overlapping intra-device operations, and/or whether transmission is to be permitted based on the antenna affected by the overlapping intra-device operations. Similar considerations may be made for some receive operations. Logic circuitry may be used in combination with a control system to implement at least some of the decisions, such as to provide a control signal output to the control system for determining when to delay a transmit operation. The above-described systems and methods may improve operation of an electronic device since the described techniques may reduce a likelihood of interrupting ongoing communications, in line with listen-before-talk operations, without under-utilizing communication circuitry, such as by not using an antenna to transmit when noise is actually from an interfering sub-system operation and/or interfering transmission from the electronic device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device comprising:
 transceiver circuitry configured to
  generate a first communication associated with a first frequency band, and
  generate a second communication associated with a second frequency band that interferes with the first frequency band; and
 processing circuitry configured to
  receive a first indication of whether the second communication is ongoing and a second indication of a threshold amount of energy, and communicate signals associated with the first communication using a first portion of antenna circuitry corresponding to the first frequency band, a second portion of the antenna circuitry corresponding to the first frequency band, a third portion of the antenna circuitry, or any combination thereof based on the first indication and based on a first amount of energy received by the first portion of the antenna circuitry, a second amount of energy received by the second portion of the antenna circuitry, a third amount of energy received by the third portion of the antenna circuitry, or any combination thereof, and based on the threshold amount of energy.

2. The device of claim 1, wherein the processing circuitry is configured to communicate the signals using the first portion of the antenna circuitry and the second portion of the antenna circuitry based on
the first indication indicating that the second communication is not ongoing, and
the first amount of energy received by the first portion of the antenna circuitry and the second amount of energy received by the second portion of the antenna circuitry each being less than the threshold amount of energy.

3. The device of claim 2, wherein the first indication corresponds to additional antenna circuitry not communicating using the second frequency band.

4. The device of claim 1, wherein the processing circuitry is configured to communicate the signals using the first portion of the antenna circuitry and the second portion of the antenna circuitry based on
the first indication indicating that the second communication is ongoing,
one of the first amount of energy received by the first portion of the antenna circuitry or the second amount of energy received by the second portion of the antenna circuitry being less than the threshold amount of energy, and
another one of the first amount of energy or the second amount of energy being greater than or equal to the threshold amount of energy.

5. The device of claim 1, wherein the processing circuitry is configured to communicate the signals using the third portion of the antenna circuitry based on
the first indication indicating that the second communication is ongoing, and
the first amount of energy received by the first portion of the antenna circuitry and the second amount of energy received by the second portion of the antenna circuitry each being greater than or equal to the threshold amount of energy.

6. The device of claim 1, wherein the processing circuitry is configured to delay communicating the signals associated with the first communication based on the first amount of energy, the second amount of energy, the third amount of energy, or any combination thereof being greater than the threshold amount of energy.

7. The device of claim 1, wherein the first portion of the antenna circuitry corresponds to a first antenna, and wherein the second portion of the antenna circuitry corresponds to a second antenna.

8. The device of claim 1, wherein the processing circuitry is configured to
receive a third indication of whether the second portion of the antenna circuitry is affected by an intra-device operation; and
receive the signals using the first portion of the antenna circuitry and the second portion of the antenna circuitry based on the third indication.

9. A method, comprising:
generating, via processing circuitry communicatively coupled to transceiver circuitry, signals configured to be communicated via a first antenna of the transceiver circuitry, a second antenna of the transceiver circuitry, or both;
receiving, via the processing circuitry, a first indication that sensing energy received by the second antenna is inaccurate; and
communicating, via the transceiver circuitry, the signals using the second antenna based on the first indication and an amount of energy received by the first antenna being less than a threshold amount of energy.

10. The method of claim 9, comprising communicating, via the transceiver circuitry, the signals using the second antenna and the first antenna based on the amount of energy received by the first antenna being less than the threshold amount of energy and based on the amount of energy received by the second antenna being greater than or equal to the threshold amount of energy.

11. The method of claim 10, comprising:
generating, via the processing circuitry, additional signals configured to be communicated via the first antenna, the second antenna, or both; and
communicating, via the transceiver circuitry, the additional signals using the second antenna without the first antenna based on an additional amount of energy received by the first antenna being greater than or equal to the threshold amount of energy and an additional amount of energy received by the second antenna being less than the threshold amount of energy.

12. The method of claim 9, comprising:
receiving, via the processing circuitry, an indication that a device operation uses a frequency band, the frequency band interfering the signals, and
pausing, via the processing circuitry, communication of the signals using the second antenna based on the indication.

13. The method of claim 12, wherein the device operation corresponds to concurrent operation of a universal serial bus (USB) device, a power connection, an external device, or any combination thereof.

14. The method of claim 9, comprising communicating, via the transceiver circuitry, additional signals using the first antenna, the second antenna, a third antenna, or any combination thereof based on a first amount of energy received by the first antenna, a second amount of energy received by the second antenna, based on a third amount of energy received by the third antenna, and based on the threshold amount of energy.

15. A device, comprising:
a first portion of antenna circuitry configured to communicate via a first frequency band;
a second portion of the antenna circuitry configured to communicate via a second frequency band that interferes with the first frequency band;
a third portion of the antenna circuitry configured to communicate via the first frequency band; and
processing circuitry configured to
receive a first indication that communications using the first portion of the antenna circuitry are free of interference by an intra-device operation and a second indication of a threshold amount of energy, and communicate using the first portion of the antenna circuitry, the second portion of the antenna circuitry, the third portion of the antenna circuitry, or any combination thereof based on the first indication and based on a first amount of energy received by the first portion of the antenna circuitry, a second amount of energy received by the second portion of the antenna circuitry, a third amount of energy received by the third portion of the antenna circuitry, or any combination thereof, and based on the threshold amount of energy.

16. The device of claim 15, wherein the processing circuitry is configured to communicate based on enabling a receiver.

17. The device of claim 15, wherein the intra-device operation corresponds to operation of a universal serial bus (USB) device, a power connection, an external device, or any combination thereof.

18. The device of claim 15, wherein the processing circuitry is configured to transmit signals without the second portion of the antenna circuitry based on the second portion of the antenna circuitry being affected by concurrent operation of the first portion of the antenna circuitry.

19. The device of claim 15, wherein the processing circuitry is configured to transmit signals without the second portion of the antenna circuitry based on the second portion of the antenna circuitry receiving the first amount of energy greater than or equal to the threshold amount of energy.

20. The device of claim 19, comprising logic circuitry that compares noise energy received via the second portion of the antenna circuitry to the threshold amount of energy, the first indication being generated based on an output from the logic circuitry.

* * * * *